US005486581A

United States Patent [19]
Ash

[11] Patent Number: 5,486,581
[45] Date of Patent: Jan. 23, 1996

[54] CROSSLINKED POLYKETONE POLYMER

[75] Inventor: Carlton E. Ash, Sugar Land, Tex.

[73] Assignee: Shell Oil Company, Houston, Tex.

[21] Appl. No.: 155,396

[22] Filed: Nov. 19, 1993

[51] Int. Cl.$^6$ .................................................. C08G 63/00
[52] U.S. Cl. ............................ 525/539; 525/85; 528/271; 528/392
[58] Field of Search ................... 525/539, 85; 528/392, 528/271

[56] References Cited

U.S. PATENT DOCUMENTS 4,834,144  5/1989  Tisne.
4,929,701  3/1989  Van Brockhoven .................... 525/539

OTHER PUBLICATIONS

"Crosslinking of HDPE during Reactive Extrusion: Rheology, Thermal, and Mechanical Properties," K. J. Kim and B. K. Kim, *Journal of Applied Polymer Science*, vol. 48, 981–986 (1993).

"Properties of Three Types of Crosslinked Polyethylene," by S. Venkatraman and L. Kleiner, *Advances in Polymer Technology*, vol. 9, No. 3, 265–270 (1989).

Encyclopedia of Polymer Science and Engineering, 2nd Ed., pp. 600–601.

*Primary Examiner*—James J. Seidleck
*Assistant Examiner*—Richard Jones

[57] ABSTRACT

It is herein disclosed crosslinked or latently crosslinkable polyketone polymer comprising the polymer, and a minor amount of an iodide salt, wherein the crosslinking is induced by the action of heat and oxygen. It is also disclosed a process for producing crosslinked or crosslinkable polyketone polymers comprising contacting and admixing the polymer and at least one iodide salt prior to exposure to the action of heat and oxygen.

7 Claims, No Drawings

CROSSLINKED POLYKETONE POLYMER

FIELD OF INVENTION

This invention generally relates to polyketone polymers. More particularly, the invention relates to crosslinked and latently crosslinkable polyketone polymers, wherein the crosslinking action is induced by the combined action of heat, oxygen and at least one iodide salt.

BACKGROUND OF THE INVENTION

Polyketone polymers are of considerable interest because they exhibit many desirable physical properties which make them suitable for engineering thermoplastic applications. In particular, high molecular weight linear alternating polyketone polymers possess such properties as high strength, rigidity, toughness, chemical resistance, and wear properties. While these properties are adequate for many applications it would be of advantage to further improve certain properties such as environmental stress crack resistance, chemical resistance, creep resistance, increased use temperature and increased tensile strength. One method known in the art for providing these improvements has involved the crosslinking of linear polymer chains of a thermoplastic polymer. An example of this is polyethylene which can be made to exhibit increased durability, use temperature and strength through post-reactor crosslinking.

In order to maintain good melt processability and flow during part fabrication it is generally desirable to utilize polymers of substantially linear molecular structure before crosslinking. Therefore, it is particularly desirable to have a simple procedure which can crosslink the substantially linear polymer after melt processing. Crosslinking a polymer after melt processing is useful in maintaining a high degree of crystallinity in the final part and allows common methods of melt fabrication such as injection molding, extrusion, and blow molding to be used.

SUMMARY OF THE INVENTION

It is a general object of the invention to provide a crosslinked or latently crosslinkable polyketone polymer.

It is a particular object of the invention to provide a crosslinked or latently crosslinkable polyketone polymer having and exhibiting improved mechanical and chemical resistant properties.

Accordingly, it is hereby provided a crosslinked or latently crosslinkable polyketone polymer comprising the polymer, and a minor amount of an iodide salt, wherein the crosslinking is induced the action of heat and oxygen.

It is also provided a process for producing a crosslinked polyketone polymer comprising contacting and admixing a sufficient amount of an iodide salt with the polymer, and exposing the polymer to a sufficient amount of oxygen and heat.

DETAILED DESCRIPTION OF THE INVENTION

The materials useful in practicing this invention include a substantially linear alternating polymer of carbon monoxide and at least one ethylenically unsaturated hydrocarbon (simply referred to as a polyketone polymer), an iodide salt, heat, oxygen, and other common polymer additives. For instance, fillers, extenders, lubricants, pigments, plasticizers, and other polymeric additives can be added to the polymer to improve its properties.

Generally, speaking, the practice of this invention involves admixing a sufficient (minor) amount of the iodide salt with the polyketone polymer to form a polyketone blend and applying heat and oxygen to the blend. One critical aspect of this practice is that the iodide salt is to be blended into the polymer prior to or after melt processing, but before the application of heat and oxygen.

The useful materials and the process of the invention are herein further disclosed.

The polyketone polymers which are useful in the practice of the invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

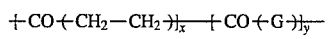

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(CH$_2$—CH$_2$)— units and the —CO—(G)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,831,144 which is herein incorporated by reference.

The useful iodide salts are those which are capable of crosslinking polyketone polymers under appropriate conditions. Examples of these salts include those listed in Table 1.

TABLE 1

Iodide Salts

| | | |
|---|---|---|
| Tetraphenylphosphonium | $PPh_4^+$ | $ZnI_2$ - Zinc iodide |
| Bis(triphenylphosphoranylidene) ammonium | $Ph_3P-N^+-PPh_3$ | $CaI_2$ - Calcium iodide |
| Insitu 4-iodophenyltriphenyl-phosphonium 1,4-bis(triphenylphosphonium) benzene | $PPh_3 + I-C_6H_4-I \rightarrow I-C_6H_4-PPh_3^+$ or $Ph_3P^+-C_6H_4-{}^+PPh_3$ | $Et_4NI$ - tetraethylammonium iodide |
| | | $Me_4NI$ - tetramethylammonium idodide |
| 5-methyl-3-(methylthio-1,4-diphenyl 1H-1,2,4-triazolium | [structure of triazolium cation with CH₃S, N-N, CH₃, N⁺-phenyl, phenyl substituents] | $PPh_3MeI$ - Methyltriphenyl-phosphonium iodide |
| 9-phenanthryl triphenylphosphonium | | $PMe(OPh)_3I$ - Methyltriphenoxy-phosphonium iodide |
| | | $PPh_4Cl$ - Tetraphenylphosphonium chloride |
| $KI^1$ | | $PPh_4Br$ - Tetraphenylphosphonium bromide |

[1] Other alkali metal iodide salts such as lithium, potassium, and sodium iodide are also within the scope of the invention.

The preferred iodide salts are those which also result in an increase in the long-term heat aging stability of the polymer. Such preferred iodide salts have been disclosed in related application, U.S. Ser. No. 08/155,395 (Attorney Docket No. T-3263), and are therein referred to as onium iodide salts of Group 15 of the Periodic Table of Elements such as nitrogen, phosphorus, arsenic, or combinations thereof, in which the organic groups comprising the cation coordination sphere is shielded by aromatic substituents. Specific examples of the preferred iodide salts include tetraphenylphosphonium iodide and bis(triphenylphosphoranylidene)ammonium.

Linear polyketone polymers containing a sufficient (minor) amount of iodide salt are crosslinked when heated in the presence of oxygen. While not wanting to be held to any particular theory, it is believed that some oxidation of the polyketone polymer occurs which in the presence of an iodide salt catalyzes the crosslinking reaction. The extent of crosslinking is controllable by the amount of exposure to heat and oxygen. The time required to obtain a desired level of crosslinking is inversely related to the temperature used or the oxygen content available. An effective oxygen source is air. The amount of heat required is that which is sufficient to lead to the crosslinking of the polymer. The required amount of heat can be obtained at a preferred operating temperature of about 70° C. While the inventive process can crosslink a polyketone polymer melt in the presence of sufficient oxygen, it is generally preferred as discussed earlier to crosslink at temperatures below the crystalline melting point of the polymer.

Methods known in the art for crosslinking polyethylene include (1) the use of high energy radiation, (2) thermo-chemical reactions, and (3) moisture induced reactions. Methods (1) and (2) rely on the initiation of free-radical intermediates either through radiation or radical initiators such as organic peroxides. In polyethylene these radical intermediates result in chemical crosslinks between polymer chains, however, these methods are not applicable to all polyolefins. Polypropylene and polybutylene are examples where radical initiation does not result in crosslinking, but rather chain scission. These methods also possess certain disadvantages which are known to the skilled artisan.

The method of crosslinking polyethylene which utilizes moisture first requires free-radical grafting of vinyl silane units onto the polyolefin which are then capable of reacting with water to produce chemical crosslinks. Since crosslinking occurs after melt processing, this method like radiation curing, allows conventional fabrication methods to be used and maintains a high degree of crystallinity after crosslinking.

The above methods are not entirely suitable for polyketone polymers. Radiation curing is not possible because chain scission reactions can occur in polyketones. Thermochemical crosslinking processes which involve adding enough heat to cause the substantially linear polymer to melt and flow into a desired form just as crosslinking occurs are also not suitable. First, the processing temperatures of polyketones are considerably higher than in polyethylene which would result in the premature decomposition of any free-radical initiators (organic peroxides). Second, unlike simple polyolefins, the reactivity of polyketones is more diverse and can lead to unwanted free radical degradation reactions of the polymer.

Moisture crosslinking of polyketone polymer may be possible if silane grafting could be carried out by some means other than a free-radical process. It is envisioned that a silane grafting method for polyketones is feasible if the vinyl groups commonly used in polyethylene were replaced with groups capable of reacting with ketones such as amines. Examples would include (trialkylsilyl)alkylamines and (trialkylsilyl)aryl-amines.

Broadly speaking, the process of the invention involves dispersing a sufficient amount of an iodide salt or a combination of iodide salts into a substantially linear polyketone polymer. The iodide salt may be incorporated into the polyketone polymer at any stage of its processing, preferably prior to being subjected to the combined action of heat and oxygen. The method of incorporating the iodide salt is not considered critical so long as the method results in a substantially uniform blend of the composition components. Such methods include diffusional addition of the iodide salt, in-situ formation of the iodide (salt(s), and melt blending of the iodide salt have been disclosed in more detail in U.S. Ser. No. 08/155,395 (Attorney Docket No. T-3263). In general, the iodide salts are employed in an amount within the range of from 0.01 to 10 percent based on the weight of the polyketone polymer. After incorporation of the iodide salt, the polyketone polymer is then subjected to the combined action of heat and oxygen in amounts which are sufficient to form a polyketone polymer with a crosslinked molecular structure.

The current invention takes a linear polymer which is completely soluble in HFIPA and crosslinks it such that it becomes only swollen by the solvent. One method known for determining the extent of crosslinking is by measuring its solubility or swellability in a suitable solvent. Suitable solvents are usually polar solvents with low molar volume, especially those having a strong hydrogen bonding characteristic. Examples of such solvents include hexafluoroisopropanol, m-cresol, and phenol. Hexafluoroisopropanol is preferred because of its ability to dissolve the polyketone polymer at room temperature.

The various aspects of the invention are further illustrated by the following non-limiting examples.

EXAMPLES

Example 1

Polyketone polymer A with a melting point of about 220° C. and limiting viscosity number of 1.87 dl/g was compounded with 0.3 wt % tetraphenylphosphonium iodide ($PPh_4I$) and 0.5% Irganox 1076 on a 15 mm Baker Perkins extruder operated at a melt temperature of approximately 250° C. A control was prepared by extruding polymer A as described above without the use of any additives. After this, the pellets were dried in a vacuum oven at 50° C. under nitrogen and then compression molded into 20 mil thick plaques.

Test specimens were cut from the plaques in 1 cm wide strips and exposed to oxygen and heat using a Blue M forced air oven set at 125° C. The samples were withdrawn from the oven after 11 days exposure and submitted for GPC analysis using hexafluoroisopropanol (HFIPA) as solvent. GPC analysis utilized ZORBAX 1000 and 60 PSM columns in series and a Waters 410 differential refractometer as detector.

Table 1 shows that as expected of linear polyketone polymers, both unexposed samples were completely soluble in HFIPA. After exposure to heat and oxygen, polyketone polymers without iodide additives are soluble and exhibited a molecular weight loss. The polymer sample containing iodide became a swollen gel (50% sol) indicative of a crosslinked polymer. This sample, however, did not experience embrittlement in the same oven until 43 days compared to the specimen without $PPh_4I$ which embrittled in only 15 days.

TABLE 2

| $PPh_4I$ Promoted Crosslinking of Polyketone Polymer | | |
|---|---|---|
| $PPh_4I$ Content | Days @ 125C. | Molecular Weight (Mn) |
| None | 0 | 55900 |
| None | 11 | 34510 |
| 0.3% | 0 | 55280 |
| 0.3% | 11 | Insoluble |

Example 2

Polyketone polymer B, with a melting point of about 220° C., an LVN of 1.95 dl/g, and containing 0.5% Irganox 1330 and 0.5% Nucrel 535, was melt extruded into 20 mil sheet. One centimeter wide strips of this sheet were exposed to heat and oxygen as described in Example 1. In addition to these strips, a separate set of strips was submitted to a saturated aqueous $PPh_4I$ solution at 85° C. for 20 min. The strips were removed, wiped clean, and then dried in a vacuum oven at 50° C. under nitrogen purge. These strips containing $PPh_4I$ by diffusion were then exposed to heat and oxygen as described above. Table 2 shows that after heat exposure the polyketone polymer with iodide was again an insoluble swollen gel (20% sol) in HFIPA, while the sample without iodide treatment was completely soluble and displayed a loss in molecular weight. This example shows that iodide can be added after part fabrication but before heat and oxygen is applied to yield a crosslinked polyketone.

TABLE 3

| Diffusional Treatment of Polyketone Parts with $PPh_4I$ | | |
|---|---|---|
| $PPh_4I$ Treatment | Days @ 125C. | Molecular Weight (Mn) |
| No | 0 | 50562 |
| No | 5 | 34660 |
| Yes | 5 | Insoluble |

Example 3

Polymer strips containing either potassium iodide or tetraethylammonium iodide were prepared and tested as described in Example 2 with the exception that 2 wt % of the respect iodide solutions were replaced for the $PPh_4I$ solution. It was observed that after 10 days at 125° C. both samples were insoluble in HFIPA. This demonstrates that iodides other than $PPh_4I$ also promote oxidative curing of polyketones.

Example 4

Polyketone polymer C, melting point of about 220° C. and LVN of 1.84 dl/g, was injection molded into ⅛ inch ASTM D-638 tensile bars. Part of the bars were exposed to heat and oxygen for 20 days as describe in Example 1, while a separate set was first treated with a saturated aqueous solution of $PPh_4I$ at 80° C. for 90 minutes before heat exposure. Table 3 shows the tensile property, GPC, and DSC results before and after heat exposure. GPC was measure both on the skin and core of the tensile bars, while DSC was measured on the skin. This example shows that PPh$_4$I promotes oxidative crosslinking which provides greater tensile strength and solvent resistance while maintaining a high degree of crystallinity.

This example demonstrates that PPh$_4$I promotes oxidative crosslinking which provides greater tensile strength and solvent resistance while maintaining a high degree of crystallinity. Crosslinking, as indicated by insolubility in HFIPA, is demonstrated only in the sample containing PPh$_4$I combined with sufficient exposure to heat and oxygen, i.e. the outer portions of the sample. As a result of crosslinking, the PPh$_4$I-containing sample shows a 24% increase in yield strength, while the specimen without PPh$_4$I exhibits oxidative degradation resulting in a loss of yield and molecular weight (40% drop in number average molecular weight (Mn) of skin). Crosslinking in the manner described did not diminish the extent of crystallinity relative to the uncrosslinked polymer as apparent in the large heat of fusion values which are a proportional measure to the extent of crystallinity.

TABLE 4

Diffusional Treatment of Polyketone Parts with PPh$_4$I.

| PPh$_4$I Treated | Days @ 125° C. | Yield Strength, psi | Break Strain, % | Mn (skin) | Mn (core) | Tm, °C. | Heat Fusion, J/g |
|---|---|---|---|---|---|---|---|
| No | 0 | 8700 | 670 | 46825 | | 222 | 81 |
| No | 20 | No yield$^a$ | 23 | 28163 | 52305 | 222 | 103 |
| Yes | 0 | 8700 | 670 | 46825 | | | |
| Yes | 20 | 10790 | 70 | Insoluble | 53482 | 219 | 100 |

$^a$Break stress was 9180 psi.

While this invention has been described in detail for the purpose of illustration, it is not to be construed as limited thereby but is intended to cover all changes and modifications within the spirit and scope thereof.

That which is claimed is:

1. A crosslinked composition comprising a linear alternating polyketone polymer of carbon monoxide and at least one ethylenically unsaturated hydrocarbon, and a minor amount of at least one iodide salt, wherein crosslinking is induced by the action of a sufficient amount of heat and oxygen.

2. A crosslinked composition as in claim 1 wherein said iodide salt is selected from the group consisting of tetraphenylphosphonium, bis(triphenylphosphoranylidene) ammonium, 4-iodophenyltriphenylphosphonium, 1,4-bis(triphenylphosphonium)benzene, 5-methyl-3-(methylthio)-1,4-diphenyl 1H- 1,2,4-triazolium, 9-phenanthryl triphenylphosphonium, and alkali metal iodides.

3. A crosslinked composition as in claim 1 wherein said iodide is present in an amount of from 0.01 to 10 weight percent.

4. A latently crosslinkable composition comprising a major amount of substantially linear alternating polymer of carbon monoxide and at least one ethylenically unsaturated hydrocarbon, and a minor amount of an onium iodide salt of nitrogen, phosphorus, arsenic, or combination thereof, in which the organic group comprising the cation coordination sphere is shielded by aromatic substituents.

5. A composition as in claim 4 wherein said iodide salt is present in an amount of from 0.01 to 10 weight percent.

6. An article of manufacture made from the composition of claim 1.

7. A process for producing crosslinked polyketone polymer comprising admixing a minor amount of an iodide salt with a linear alternating polyketone polymer of carbon monoxide and at least one ethylenically unsaturated hydrocarbon, and exposing said polymer to a sufficient amount of oxygen and heat to cause crosslinking of said polyketone polymer.

* * * * *